US012738691B2

(12) United States Patent
Yao

(10) Patent No.: US 12,738,691 B2
(45) Date of Patent: Sep. 15, 2026

(54) CONNECTOR MODULE AND ELECTRONIC DEVICE

(71) Applicant: DONGGUAN LUXSHARE TECHNOLOGIES CO., LTD, Dongguan City (CN)

(72) Inventor: Kunlin Yao, Dongguan City (CN)

(73) Assignee: DONGGUAN LUXSHARE TECHNOLOGIES CO., LTD, Dongguan City (CN)

( * ) Notice: Subject to any disclaimer, the term of this patent is extended or adjusted under 35 U.S.C. 154(b) by 371 days.

(21) Appl. No.: 18/398,829

(22) Filed: Dec. 28, 2023

(65) Prior Publication Data

US 2024/0356284 A1 Oct. 24, 2024

(30) Foreign Application Priority Data

Apr. 20, 2023 (CN) ......................... 202320901832.5

(51) Int. Cl.
*H01R 13/631* (2006.01)
*H01R 12/52* (2011.01)
(Continued)

(52) U.S. Cl.
CPC ......... *H01R 13/6315* (2013.01); *H01R 12/52* (2013.01); *H01R 12/58* (2013.01); *H01R 13/621* (2013.01); *H01R 2103/00* (2013.01)

(58) Field of Classification Search
CPC .... H01R 13/6315; H01R 12/52; H01R 12/58; H01R 13/621; H01R 2103/00;
(Continued)

(56) References Cited

U.S. PATENT DOCUMENTS 4,087,146 A * 5/1978 Hudson, Jr. .......... H01R 12/714 439/493
6,053,747 A * 4/2000 Aggus .................... H01R 12/52 439/67

(Continued)

FOREIGN PATENT DOCUMENTS

| | | |
|---|---|---|
| CN | 209329258 U | 8/2019 |
| CN | 112803180 A | 5/2021 |
| CN | 215729548 U | 2/2022 |

OTHER PUBLICATIONS

Extended European Search Report for European Application No. 23188189.7, dated Jul. 12, 2024.

*Primary Examiner* — Abdullah A Riyami
*Assistant Examiner* — Nader J Alhawamdeh
(74) *Attorney, Agent, or Firm* — Birch, Stewart, Kolasch & Birch, LLP

(57) ABSTRACT

A connector module includes a first circuit board, a second circuit board, a flexible connecting member, and a floating plug. A first connector is provided on the first circuit board. The second circuit board is provided with a second connector and a first guiding hole. The flexible connecting member has a third connector connected to its one end and a fourth connector connected to its another end. The fourth connector is plugged into the first connector. The floating plug is floatingly connected to the first circuit board, where the third connector is arranged within the floating plug. The floating plug is provided with a first guiding column, and the first guiding column is arranged to pass through the first guiding hole to enable the third connector to be plugged into the second connector.

16 Claims, 9 Drawing Sheets

(51) Int. Cl.
*H01R 12/58* (2011.01)
*H01R 13/621* (2006.01)
*H01R 103/00* (2006.01)

(58) Field of Classification Search
CPC .... H01R 12/7082; H01R 12/79; H01R 12/91; H01R 12/73
See application file for complete search history.

(56) References Cited

U.S. PATENT DOCUMENTS

| | | | | |
|---|---|---|---|---|
| 2001/0029128 | A1* | 10/2001 | Horiuchi | H01R 12/79 439/578 |
| 2008/0166905 | A1* | 7/2008 | Murphy | H01R 13/6658 439/188 |
| 2024/0356284 | A1* | 10/2024 | Yao | H01R 13/621 |
| 2025/0273886 | A1* | 8/2025 | Yao | H01R 12/7047 |

* cited by examiner

CONNECTOR MODULE AND ELECTRONIC DEVICE

CROSS-REFERENCE TO RELATED APPLICATION

This application claims priority to Chinese Patent Application No. 202320901832.5 filed Apr. 20, 2023, the disclosure of which is incorporated herein by reference in its entirety.

TECHNICAL FIELD

This present disclosure relates to the technical field of electronic devices, and for example, to a connector module and an electronic device.

BACKGROUND

A plug and a socket are required when two electronic devices in the related technology need to be electrically connected to each other, one of the two electronic device is provided with the plug and the other one is provided with the socket, and the plug is plugged into the socket so as to realize electrical connection of the two electronic devices. However, in one aspect, since the range of vision is blocked by the main body of the electronic devices, the plug has to be plugged into the socket blindly, thereby causing the misalignment of the plug with the socket, the damage to the plug or the socket, and the inconvenient operation during installation, and causing a poor alignment accuracy of the plug and the socket. In another aspect, when the positions of the two electronic devices are fixed and there is an installation error in the positions of the plug and the socket, it is impossible to ensure that the plug and the socket are in an aligned state, and consequently, the plug cannot be plugged into the socket.

SUMMARY

The present disclosure provides a connector module and an electronic device.

In one aspect, a connector module is provided, which includes a first circuit board, a second circuit board, a flexible connecting member, a third connector, a fourth connector and a floating plug.

A first connector is provided on the first circuit board.

The second circuit board is provided with a second connector and a first guiding hole.

A third connector is connected to one end of the flexible connecting member and a fourth connector is connected to another end of the flexible connecting member. The fourth connector is plugged into the first connector.

The floating plug is floatingly connected to the first circuit board, where the third connector is arranged within the floating plug. The floating plug is provided with a first guiding column, and the first guiding column is arranged to pass through the first guiding hole to enable the third connector to be plugged into the second connector.

In an embodiment, the connector module further includes a connecting holder mounted on the first circuit board. The fourth connector is mounted to an end, close to the first circuit board, of the connecting holder, and the connecting holder covers the first connector.

The floating plug is floatingly connected to another end, far away from the first circuit board, of the connecting holder.

In an embodiment, one of the connecting holder and the floating plug is provided with a first connecting column, and the other of the connecting holder and the floating plug is provided with a first connecting hole. The first connecting column arranged to pass through the first connecting hole, and a first floating gap is provided between an inner wall of the first connecting hole and an outer wall of the first connecting column to enable the first connecting column to float radially within the first connecting hole.

The first connecting column is connected to the first connecting hole by a fastener.

In an embodiment, the fastener includes a first screw and a first washer, an end face of the first connecting column is provided with a first threaded hole, the first screw is arranged to pass through the first washer and be threadedly connected to the first threaded hole, and the first washer abuts against an end face of the first connecting hole.

In an embodiment, one of the first connector and the connecting holder is provided with a second guiding column, and the other of the first connector and the connecting holder is provided with a second guiding slot. The second guiding column is connected to the second guiding slot.

In an embodiment, the third connector includes a stopper plate, an elastic member and a plug-in block. The floating plug is provided with a mounting hole, an inner wall of the mounting hole is provided with a loop-shaped stopper boss, and the stopper plate is mounted to an end, far away from the second circuit board, of the mounting hole.

The plug-in block is provided with a stopper portion and a plug-in portion, and the stopper portion and the plug-in portion are connected to each other. The stopper portion is located between the stopper plate and the loop-shaped stopper boss, and an elastic member is provided between the stopper portion and the stopper plate. The plug-in portion is arranged to pass through the loop-shaped stopper boss.

In an embodiment, the loop-shaped stopper boss is provided with a third guiding column on a side, close to the second circuit board, of the loop-shaped stopper boss, the second connector is provided with a third guiding slot, and the third guiding column is configured to be able to be inserted into the third guiding slot.

In an embodiment, the floating plug is located on the side of the first connector. One of the first circuit board and the floating plug is provided with a second connecting column, and the other of the first circuit board and the floating plug is provided with a second connecting hole. The second connecting column is arranged to pass through the second connecting hole, and a second floating gap is provided between an inner wall of the second connecting hole and an outer wall of the second connecting column, to enable the second connecting column to float radially within the second connecting hole.

The second connecting column is connected to the second connecting hole by a fastener.

In an embodiment, the flexible connecting member is a flexible circuit board or a flexible wire.

In another aspect, an electronic device is provided, which includes the connector module described in any one of the above aspects.

BRIEF DESCRIPTION OF DRAWINGS

To illustrate the technical solution in embodiments of the present disclosure more clearly, the drawings used in description of the embodiments of the present disclosure are briefly described below. Apparently, the drawings described below merely illustrate part of the embodiments of the present disclosure, and the person of ordinary skill in the art may also obtain other drawings on the basis of the contents in the embodiments of the present disclosure and theses drawings on the premise that no creative efforts are made.

REFERENCE NUMERALS LIST

Figure 1:
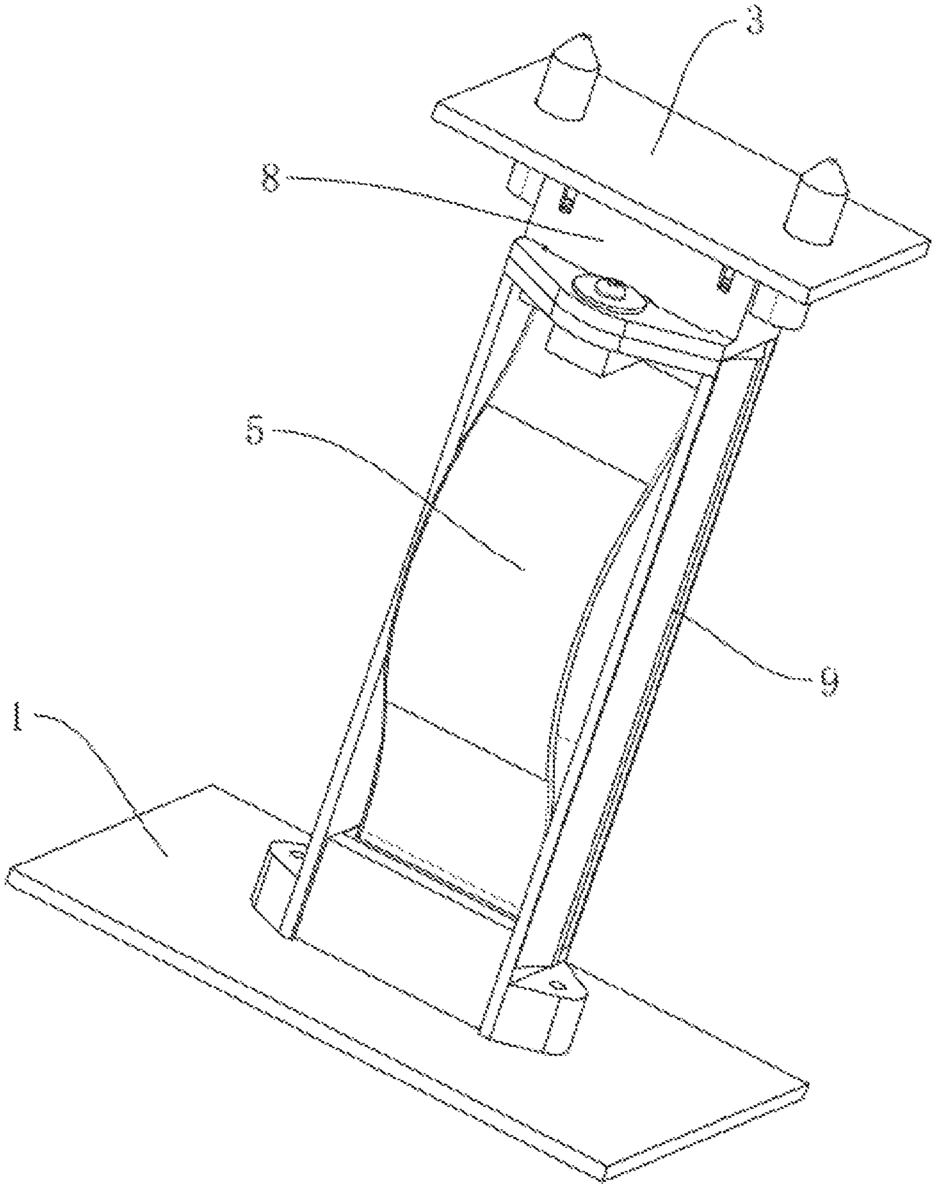
FIG. 1 is a schematic diagram showing the structure of a connector module according to a first embodiment of the present disclosure.

1. first circuit board;
11. second connecting hole;
2. first connector;
21. second guiding slot;
3. second circuit board;
31. first guiding hole;
4. second connector;
41. third guiding slot;
5. flexible connecting member;
6. third connector;
61, stopper plate;
62. elastic member;
63. plug-in block;
631. stopper portion;
632, plug-in portion;
7. fourth connector;
71. fourth guiding column;
8. floating plug;
81. first guiding column;
82. first connecting hole;
83. mounting hole;
84. loop-shaped stopper boss;
85. third guiding column;
86. second connecting column;
9. connecting holder;
91. first connecting column;
92. second guiding column;
10. fastener;
101. first screw;
102. first washer.

DETAILED DESCRIPTION

The present disclosure is further described below in detail in conjunction with drawings and embodiments. It is to be understood that the embodiments set forth below are intended to merely illustrate rather than limiting the present disclosure. It is to be noted that, for ease of description, only a part, not all, related to the present disclosure is illustrated in the drawings.

In the description of the present disclosure, unless otherwise clearly specified and limited, the terms “jointed”, “connected” and “fixed” should be understood in a broad sense, for example, it can be a fixed connection, a detachable connection or integral connection; it can be a mechanical connection or an electrical connection; it can be a direct connection or an indirect connection through an intermediary, and it can be the internal communication of two components or the interaction relationship between two components. The person of ordinary skill in the art can understand the specific meanings of the above terms in the present disclosure according to specific situations.

In the description of the present disclosure, unless otherwise expressly specified and limited, a first feature being “on” or “under” a second feature may include direct contact between the first and second features, and may also include the first and second features not in direct contact but in contact through another feature between them. Moreover, the first feature is “over”, “above” and “on” the second feature include that the first feature is directly above and obliquely above the second feature, or simply means that the first feature is horizontally higher than the second feature. The first feature is “beneath”, “below” and “under” the second feature include that the first feature is directly below and obliquely below the second feature, or simply means that the first feature has a lower level than the second feature.

In the description of the embodiments, orientations or position relations indicated by terms such as “above”, “below”, “left” and “right” are based on orientations or position relations shown in the drawings, and are intended only to facilitate the description and simplify an operation rather than indicating or implying that a device or element referred to must have such particular orientations or must be configured or operated in such particular orientations, and thus, these orientations or position relations should not to be construed as limiting the present disclosure. In addition, the terms “first” and “second” are used only to distinguish between descriptions and have no special meaning.

Embodiment One

Figure 2:
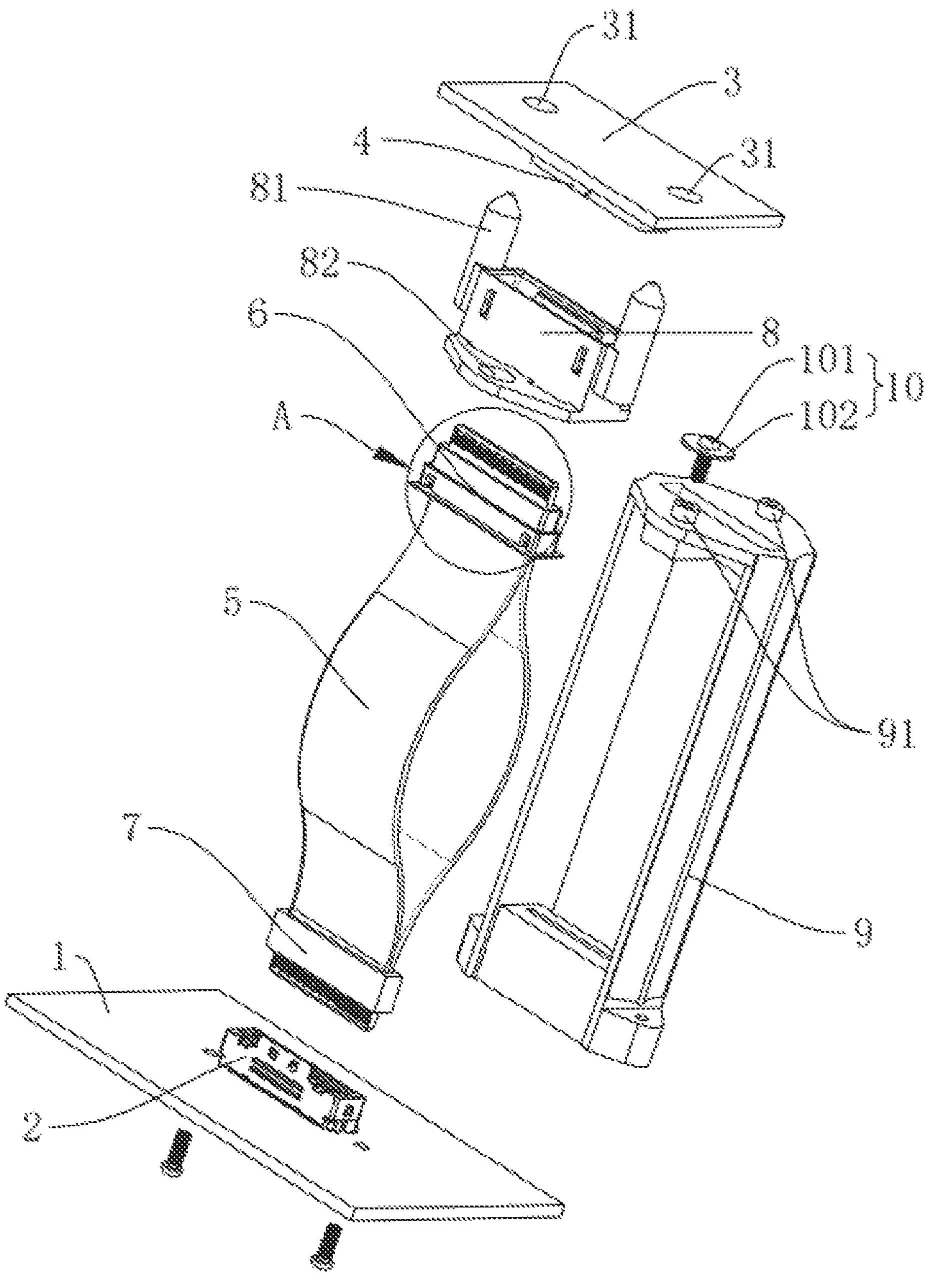
FIG. 2 is an exploded view showing the structure of the connector module according to the first embodiment of the present disclosure.

As shown in FIG. 1 and FIG. 2, an electronic device is provided according to this embodiment, the electronic device includes a connector module, and the connector module includes a first circuit board 1, a second circuit board 3, a flexible connecting member 5, and a floating plug 8.

In an embodiment, a first connector 2 is provided on the first circuit board 1; and the second circuit board 3 is provided with a second connector 4 and a first guiding hole 31. A third connector 6 is connected to one end of the flexible connecting member 5, a fourth connector 7 is connected to another end of the flexible connecting member 5, and the fourth connector 7 is plugged into the first connector 2. The floating plug 8 is floatingly connected to the first circuit board 1, and the third connector 6 is arranged within the floating plug 8. The floating plug 8 is provided with a first guiding column 81, and the first guiding column 81 is arranged to pass through the first guiding hole 31 to enable the third connector 6 to be plugged into the second connector 4. In an embodiment, the floating connecting member is a flexible circuit board or wire. In an embodiment, one of the above two interconnected connectors (e.g., the fourth connector 7 and the first connector 2, or the third connector 6 and the second connector 4) is a plug and the other is a socket.

When the first circuit board 1 and the second circuit board 3 are required to be electrically connected to each other, the first guiding columns 81 of the floating plug 8 is arranged to pass through the first guiding hole 31 of the second circuit board 3 to enable the third connector 6 to be aligned with the second connector 4 of the second circuit board 3 with high accuracy, thus the function of guiding in blind plugging is achieved, the operation is simple and the accuracy of connection is high. When the third connector 6 is plugged into the second connector 4, and sine the third connector 6, the flexible connecting member 5, the fourth connector 7, and the first connector 2 of the first circuit board 1 are connected in sequence, the electrical connection between the first circuit board 1 and the second circuit board 3 is realized. Further, the floating plug 8 is floatingly connected to the first circuit board 1, and the third connector 6 is connected to the first circuit board 1 through the flexible connecting member 5, to allow the floating plug 8 and the third connector 6 to have a floating function, and the floating plug 8 drives the third connector 6 to float relative to the first circuit board 1, thereby compensating for the installation error between the first circuit board 1 and the second circuit board 3.

In an embodiment, two first guiding holes 31 are provided, and are symmetrically arranged on two sides of the second connector 4. Two first guiding columns 81 are provided, and are symmetrically arranged on two sides of the third connector 6. The two first guiding columns 81 are arranged to pass through the two first guiding holes 31, which improves the accuracy of relative position of the floating plug 8 to the second circuit board 3.

In an embodiment, the connector module further includes a connecting holder 9 mounted on the first circuit board 1, where the fourth connector 7 is mounted to an end, close to the first circuit board 1, of the connecting holder 9. and the connecting holder 9 covers the first connector 2; and the floating plug 8 is floatingly connected to an end, far away from the first circuit board 1, of the connecting holder 9. By providing the connecting holder 9 and the floating plug 8 above the first connector 2, the area of the first circuit board 1 occupied by the connecting holder 9 and the first connector 2 can be reduced.

Figure 3:
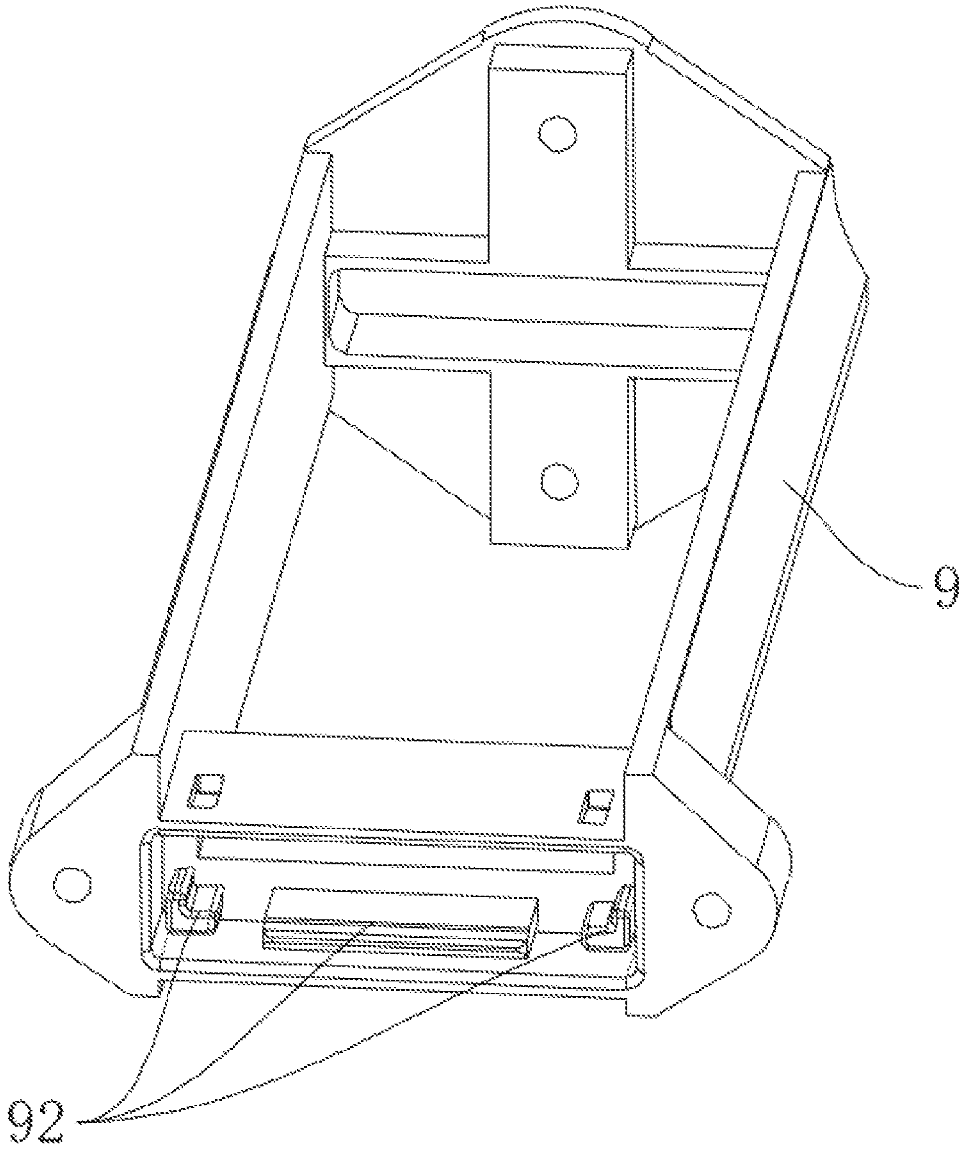
FIG. 3 is a schematic diagram showing the structure of a connecting holder according to the first embodiment of the present disclosure.
Figure 4:
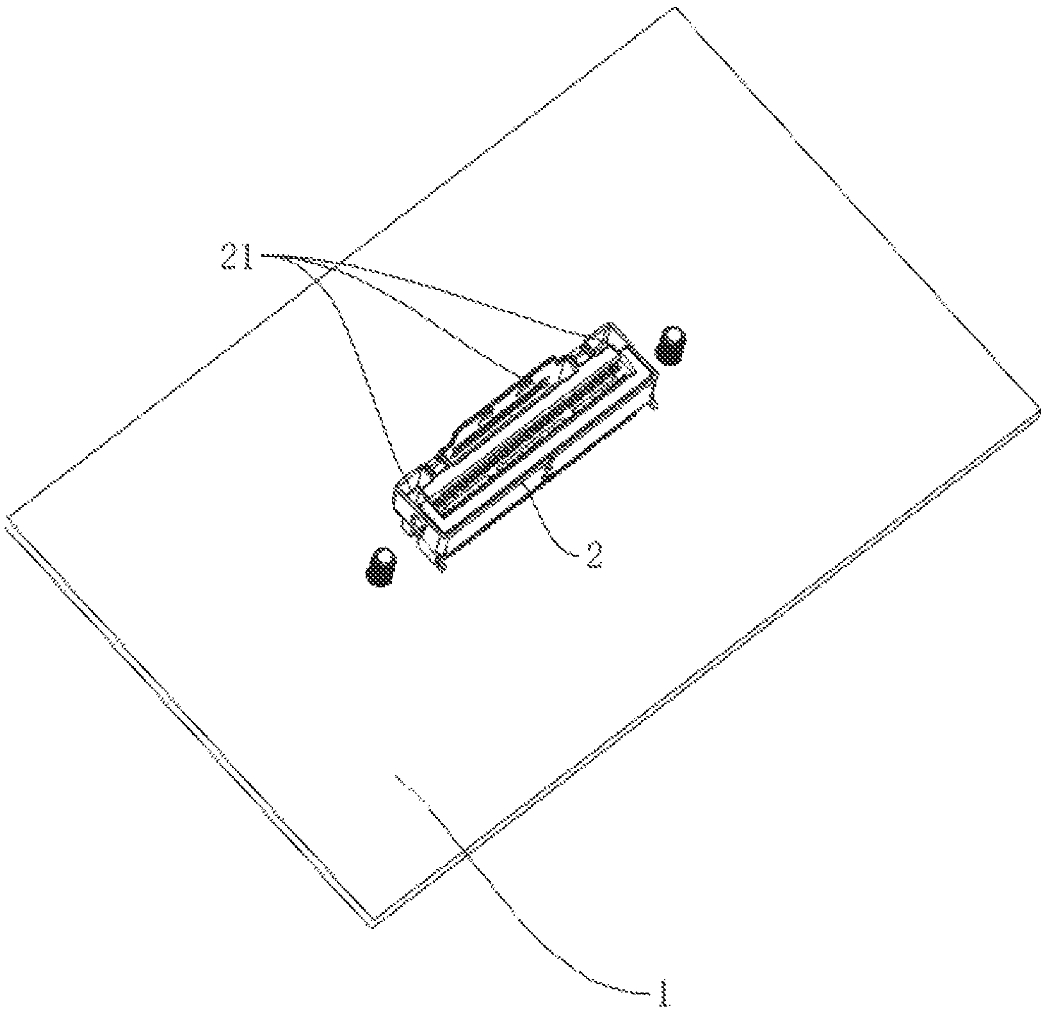
FIG. 4 is a schematic diagram showing the structure of a first circuit board and a first connector according to the first embodiment of the present disclosure.

In an embodiment, as shown in FIG. 3 and FIG. 4, one of the first connector 2 and the connecting holder 9 is provided with a second guiding column 92, the other one is provided with a second guiding slot 21, and the second guiding column 92 is inserted into the second guiding slot 21, so that the first connector 2 and the fourth connector 7 are aligned with each other with high accuracy, which facilitates the plugging of the fourth connector 7 into the first connector 2. The connecting holder 9 may be secured and fixed to the first circuit board 1 by a screw.

Figure 5:
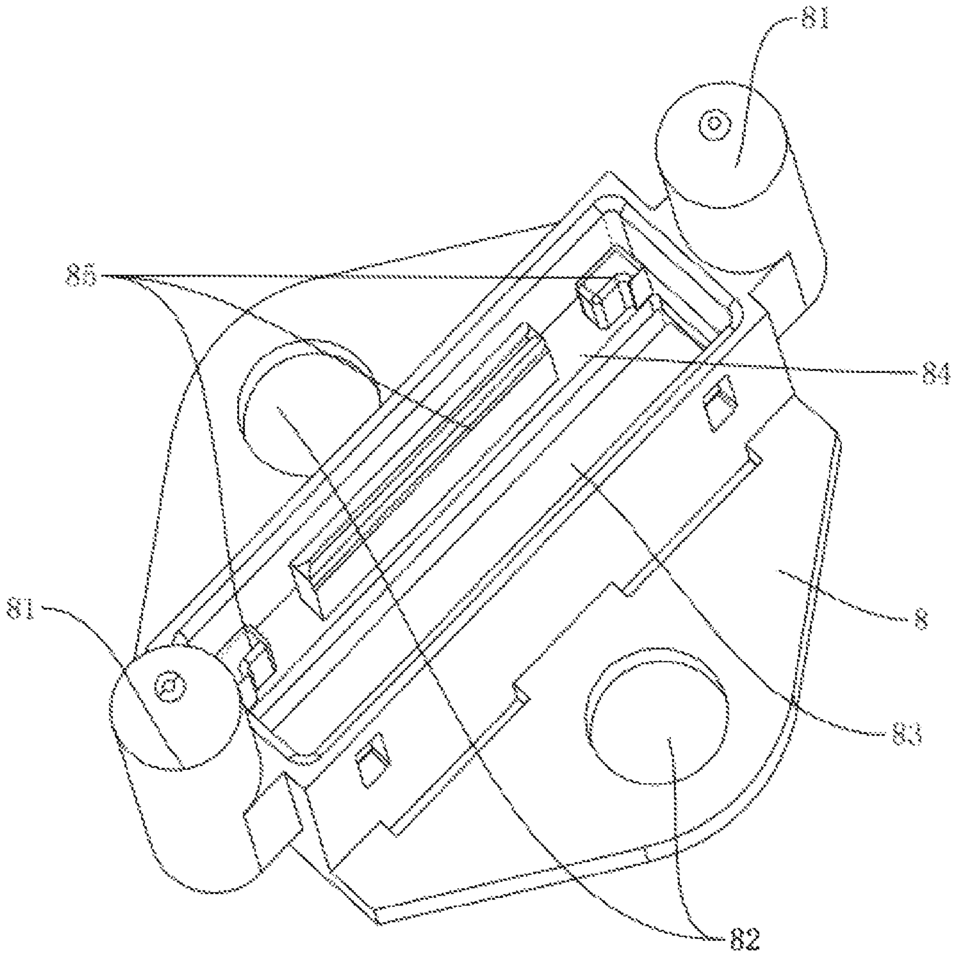
FIG. 5 is a schematic diagram showing the structure of a floating plug according to the first embodiment of the present disclosure.

In an embodiment, as shown in FIG. 2 and FIG. 5, one of the connecting holder 9 and the floating plug 8 is provided with a first connecting column 91, the other is provided with a first connecting hole 82, the first connecting column 91 is arranged to pass through the first connecting hole 82, and a first floating gap is provided between an inner wall of the first connecting hole 82 and an outer wall of the first connecting column 91 to enable the first connecting column 91 to float radially within the first connecting hole 82. The first connecting column 91 is connected to the first connecting hole 82 by a fastener 10. Specifically, the floating plug 8 can float in the first floating gap, thereby compensating for an installation error between the third connector 6 and the second connector 4 along a radial direction of the first connecting hole 82.

In an embodiment, two first connecting columns 91 and two first connecting holes 82 are provided, the two first connecting columns 91 are symmetrically arranged on two sides of the connecting holder 9. the two first connecting holes 82 are symmetrically arranged on two sides of the floating plug 8, and after the two first connecting columns 91 are arranged to pass through the two first connecting holes 82, two fasteners 10 are installed to prevent the first connecting columns 91 from being disengaged from the first connecting holes 82.

In an embodiment, the fastener 10 includes a first screw 101 and a first washer 102, an end face of the first connecting column 91 is provided with a first threaded hole, the first screw 101 is arranged to pass through the first washer 102 and be threadedly connected to the first threaded hole, and the first washer 102 abuts against an end face of the first connecting hole 82. In an embodiment, the first washer 102 abuts tightly against the end face of the first connecting hole 82. In this embodiment, the first washer 102 and the connecting holder 9 limit the position of the floating plug 8, so that the floating plug 8 is floatingly connected to the connecting holder 9, and the first connecting columns 91 is prevented from being disengaged from the first connecting holes 82.

Figure 6:
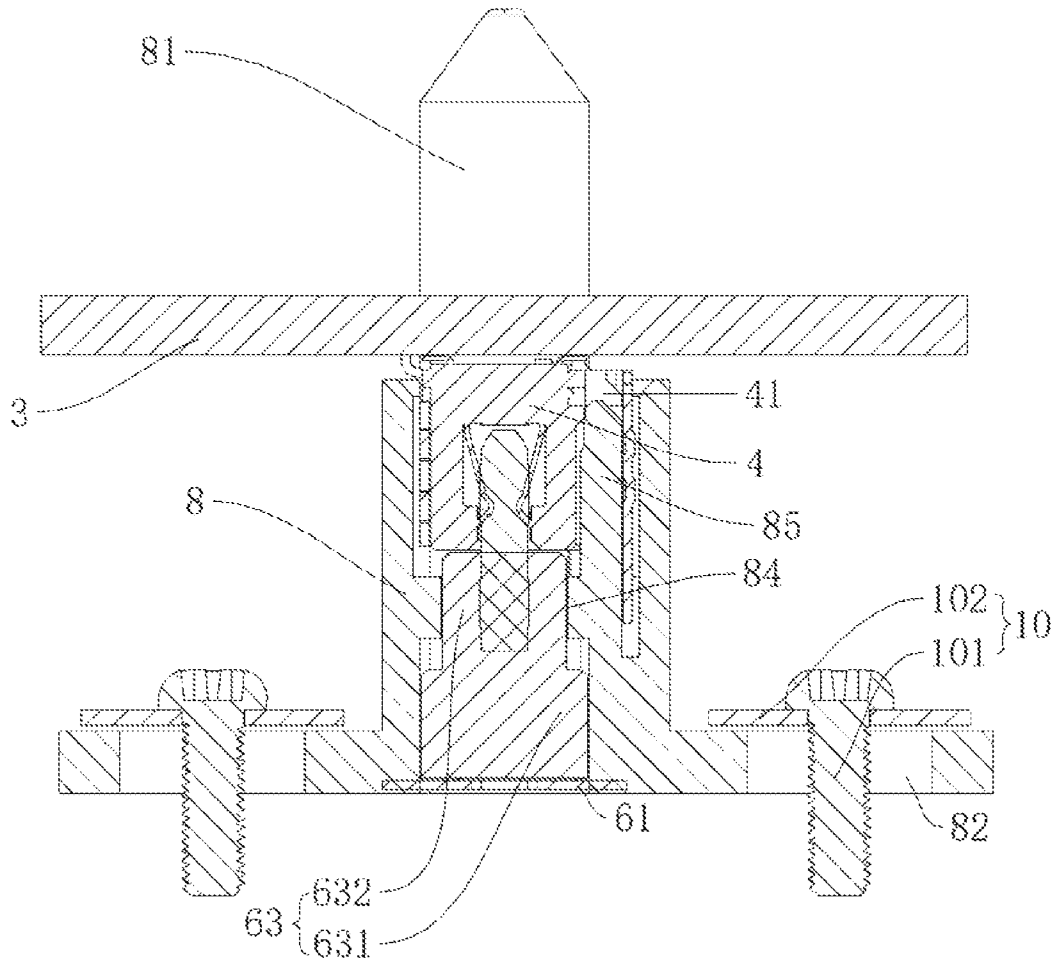
FIG. 6 is a sectional view showing partial structure of the connector module according to the first embodiment of the present disclosure.
Figure 7:
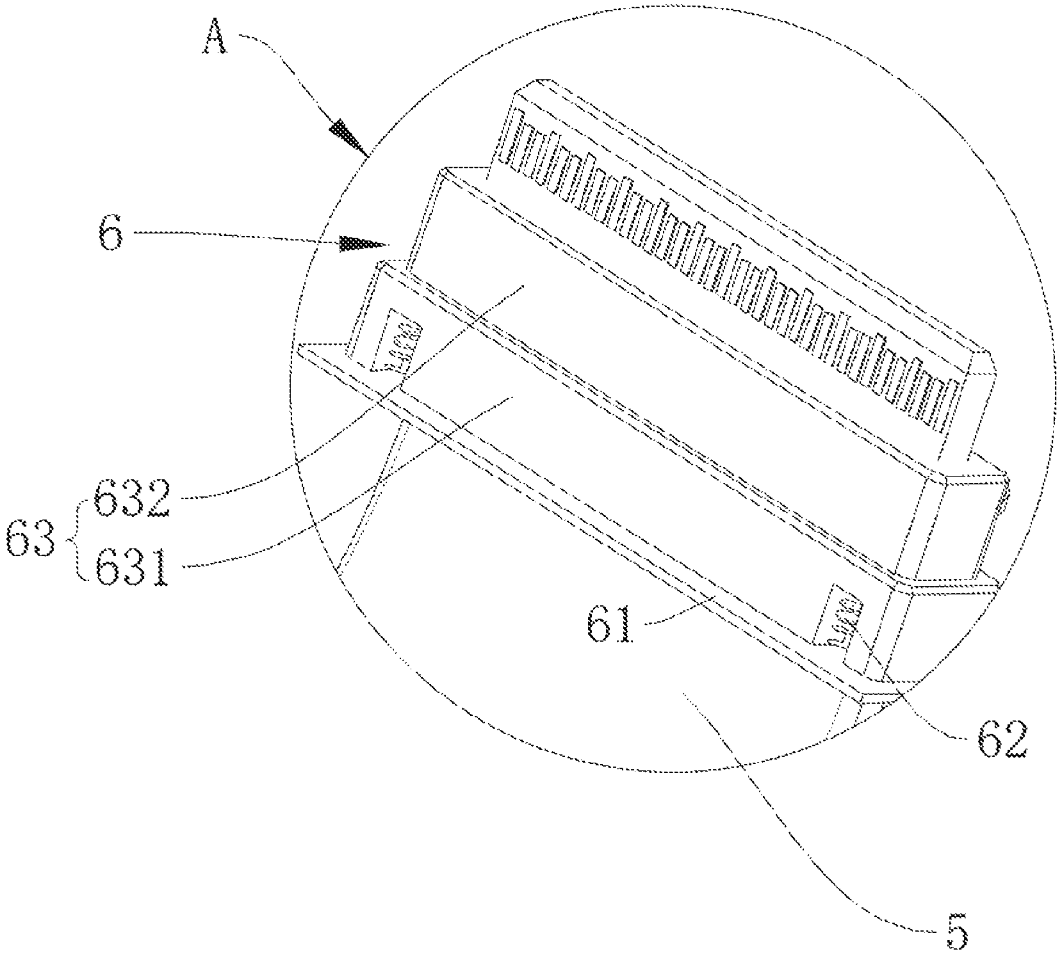
FIG. 7 is an enlarged view of part A in FIG. 2.

In this an embodiment, as shown in FIG. 5 to FIG. 7, the third connector 6 includes a stopper plate 61, an elastic member 62 and a plug-in block 63. The floating plug 8 is provided with a mounting hole 83, an inner wall of the mounting hole 83 is provided with a loop-shaped stopper boss 84, and the stopper plate 61 is mounted to an end, far away from the second circuit board 3, of the mounting hole 83. The plug-in block 63 is provided with a stopper portion 631 and a plug-in portion 632 which are connected to each other. The stopper portion 631 is located between the stopper plate 61 and the loop-shaped stopper boss 84, and the elastic member 62 is provided between the stopper portion 631 and the stopper plate 61. The plug-in portion 632 is arranged to pass through the loop-shaped stopper boss 84. With the action of the elastic force of the elastic member 62, it is possible to ensure that the plug-in block 63 of the third connector 6 is kept in a position of pressing the second connector 4. and to ensure that the plug-in portion 632 of the plug-in block 63 is plugged into the second connector 4. Further, since the elastic member 62 is configured, thus the third connector 6 can float in the plug-in direction, so that an installation error between the third connector 6 and the second connector 4 in the plug-in direction is compensated, and the fitting depth deviation between the third connector 6 and the second connector 4 is compensated.

In an embodiment, the elastic member 62 includes four springs. Four corner portions of the stopper portion 631 near one side of the stopper plate 61 are provided with spring holes, and the four springs are installed in the spring holes, so that the sidewalls of the spring holes prevent the springs from being bent, and thus the reliability of springs is high.

In an embodiment, the loop-shaped stopper boss 84 is provided with a third guiding column 85 on a side close to the second circuit board 3, the second connector 4 is provided with a third guiding slot 41, and the third guiding column 85 is able to be inserted into the third guiding slot 41, so that secondary positioning between the third connector 6 and the second connector 4 is realized, thereby improving the plugging accuracy and the connection quality.

Second Embodiment

A connector module is provided according to this embodiment, and the structures the connector module according to this embodiment are substantially the same as those of the first embodiment. Only the installation structure of the floating plug 8 is partially different. In this embodiment, the structures similar to those of the first embodiment are not repeated.

Figure 8:
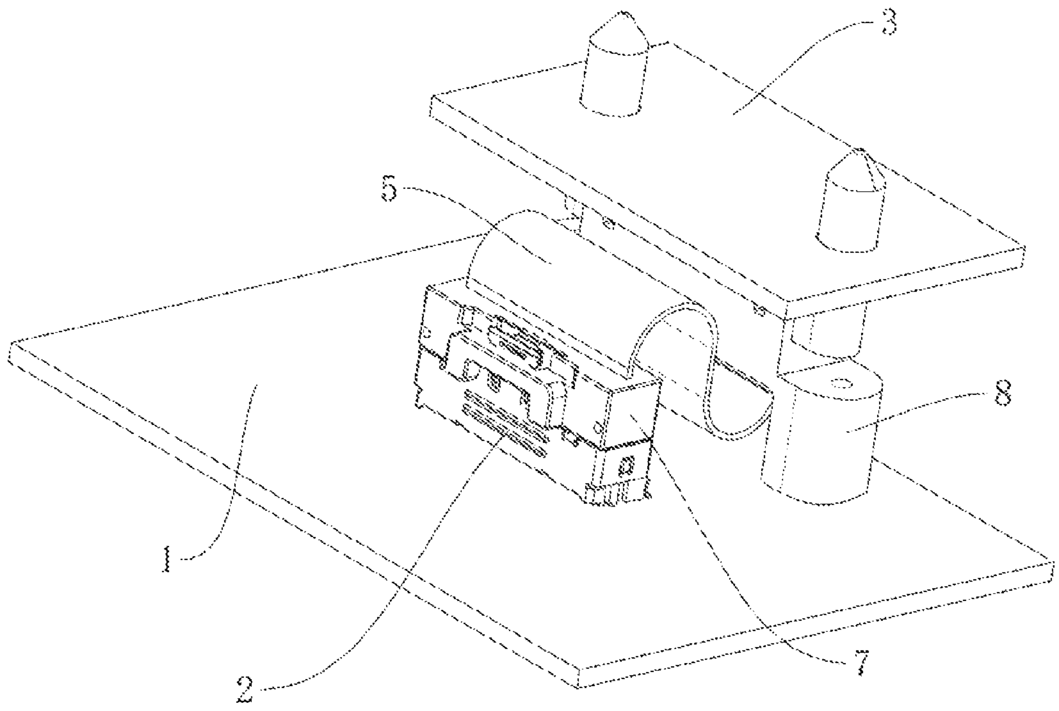
FIG. 8 is a schematic structural diagram of a connector module according to a second embodiment of the present disclosure.
Figure 9:
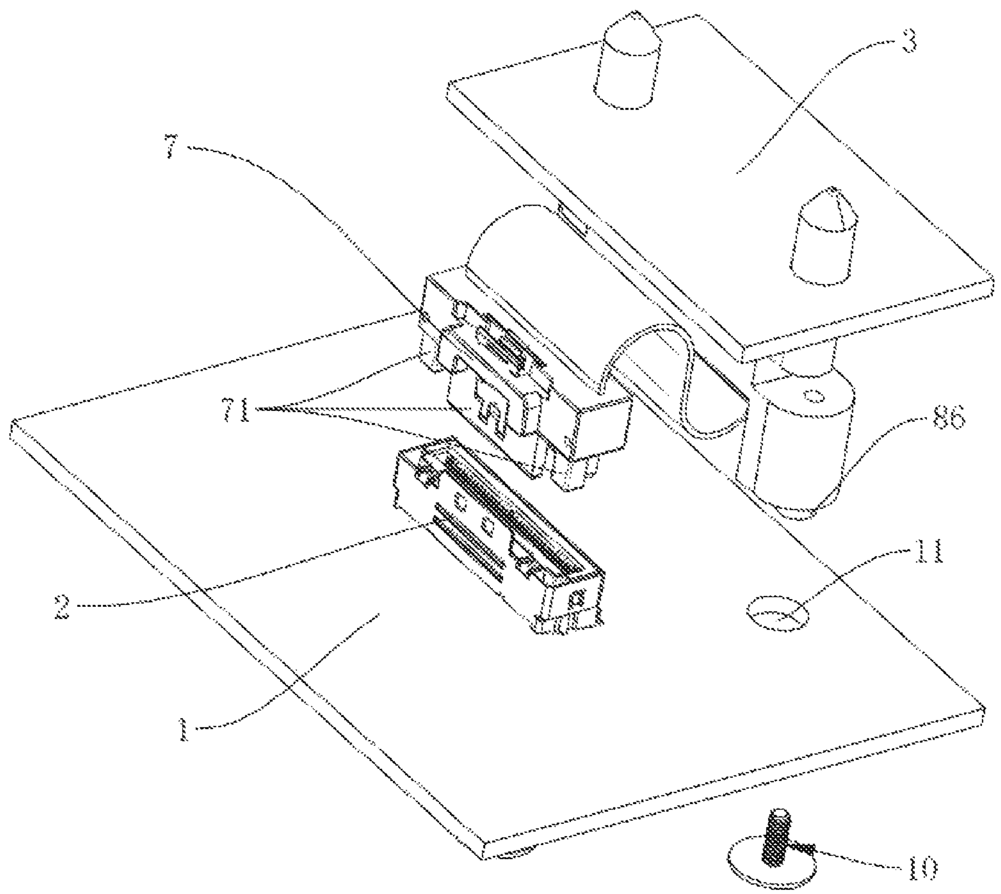
FIG. 9 is an exploded view showing the structure of the connector module according to the second embodiment of the present disclosure.

As shown in FIG. 8 and FIG. 9, in this embodiment, the floating plug 8 is located on one side of the first connector 2. One of the first circuit board 1 and the floating plug 8 is provided with a second connecting column 86, and the other is provided with a second connecting hole 11. The second connecting column 86 is arranged to pass through the second connecting hole 11. A second floating gap is provided between an inner wall of the second connecting hole 11 and an outer wall of the second connecting column 86, to enable the second connecting column 86 to float radially within the second connecting hole 11. The second connecting column 86 is connected to the second connecting hole 11 by a fastener 10. In this embodiment, different from those in the first embodiment, the structure of the connecting holder 9 is deleted, and the floating plug 8 is directly connected to the first circuit board 1 in a floating manner, so that the space occupied above the first circuit board 1 can be reduced and the space layout can be facilitated.

In an embodiment, two second connecting columns 86 and two second connecting holes 11 are provided, the two second connecting columns 86 are symmetrically arranged on two sides of the floating plug 8, the two second connecting holes 11 are arranged in the first circuit board 1, and after the two second connecting columns 86 are arranged to pass through the second connecting holes 11, two fasteners 10 are installed to prevent the second connecting columns 86 from being disengaged from the second connecting holes 11.

In an embodiment, as shown in FIG. 4 and FIG. 9, the fourth connector 7 is provided with fourth guiding columns 71, which are inserted into the second guiding slots 21, so that the first connector 2 is aligned with the fourth connector 7 with high accuracy, which facilitates plugging of the fourth connector 7 into the first connector 2.

It is to be noted that the above are merely preferred embodiments of the present disclosure and the technical principles used therein. It should be understood by the person skilled in the art that the present disclosure is not limited to the embodiments described herein. The person skilled in the art can make various apparent changes, adaptations, and substitutions without departing from the scope of the present disclosure. Therefore, although the present disclosure has been described in detail through the above embodiments, the present disclosure is not limited to the above embodiments and may include more other equivalent embodiments without departing from the concept of the present disclosure. The scope of the present disclosure is determined by the scope of the appended claims.

What is claimed is:

1. A connector module comprising:

a first circuit board provided with a first connector;

a second circuit board provided with a second connector and a first guiding hole;

a flexible connecting member, a third connector, and a fourth connector, wherein the third connector is connected to one end of the flexible connecting member, the fourth connector is connected to another end of the flexible connecting member and is plugged into the first connector; and a floating plug floatingly connected to the first circuit board, wherein the third connector is arranged within the floating plug, the floating plug is provided with a first guiding column, the first guiding column is arranged to pass through the first guiding hole to enable the third connector to be plugged into the second connector; and wherein the connector module further comprises a connecting holder mounted on the first circuit board;

the fourth connector is mounted to an end, close to the first circuit board, of the connecting holder, and the connecting holder covers the first connector; and the floating plug is floatingly connected to another end, far away from the first circuit board, of the connecting holder.

2. The connector module according to claim 1, wherein one of the connecting holder and the floating plug is provided with a first connecting column and the other of the connecting holder and the floating plug is provided with a first connecting hole, the first connecting column is arranged to pass through the first connecting hole, a first floating gap is provided between an inner wall of the first connecting hole and an outer wall of the first connecting column to enable the first connecting column to float radially within the first connecting hole, and the first connecting column is connected to the first connecting hole by a fastener.

3. The connector module according to claim 2, wherein the fastener comprises a first screw and a first washer, an end face of the first connecting column is provided with a first threaded hole, the first screw is arranged to pass through the first washer and be threadedly connected to the first threaded hole, and the first washer abuts against an end face of the first connecting hole.

4. The connector module according to claim 1, wherein one of the first connector and the connecting holder is provided with a second guiding column, the other of the first connector and the connecting holder is provided with a second guiding slot, and the second guiding column is inserted into the second guiding slot.

5. The connector module according to claim 1, wherein the third connector comprises a stopper plate, an elastic member, and a plug-in block, the floating plug is provided with a mounting hole, an inner wall of the mounting hole is provided with a loop-shaped stopper boss, the stopper plate is mounted to an end, far away from the second circuit board, of the mounting hole, and the plug-in block is provided with a stopper portion and a plug-in portion connected to each other, the stopper portion is located between the stopper plate and the loop-shaped stopper boss, an elastic member is provided between the stopper portion and the stopper plate, and the plug-in portion is arranged to pass through the loop-shaped stopper boss.

6. The connector module according to claim 5, wherein the loop-shaped stopper boss is provided with a third guiding column on a side, close to the second circuit board, of the loop-shaped stopper boss, the second connector is provided with a third guiding slot, and the third guiding column is configured to be able to be inserted into the third guiding slot.

7. The connector module according to claim 1, wherein the floating plug is located on a side of the first connector, one of the first circuit board and the floating plug is provided with a second connecting column, and the other of the first circuit board and the floating plug is provided with a second connecting hole, the second connecting column is arranged to pass through the second connecting hole, a second floating gap is provided between an inner wall of the second connecting hole and an outer wall of the second connecting column, to enable the second connecting column to float radially within the second connecting hole, and the second connecting column is connected to the second connecting hole by a fastener.

8. The connector module of claim 1, wherein the flexible connecting member is a flexible circuit board or a flexible wire.

9. An electronic device comprising a connector module, wherein the connector module comprises:

a first circuit board provided with a first connector;

a second circuit board provided with a second connector and a first guiding hole;

a flexible connecting member, a third connector, and a fourth connector, wherein the third connector is connected to one end of the flexible connecting member, the fourth connector is connected to another end of the flexible connecting member and is plugged into the first connector; and a floating plug floatingly connected to the first circuit board, wherein the third connector is arranged within the floating plug, the floating plug is provided with a first guiding column, the first guiding column is arranged to pass through the first guiding hole to enable the third connector to be plugged into the second connector; and wherein the connector module further comprises a connecting holder mounted on the first circuit board;

the fourth connector is mounted to an end, close to the first circuit board, of the connecting holder, and the connecting holder covers the first connector; and the floating plug is floatingly connected to another end, far away from the first circuit board, of the connecting holder.

10. The electronic device according to claim 9, wherein one of the connecting holder and the floating plug is provided with a first connecting column and the other of the connecting holder and the floating plug is provided with a first connecting hole, the first connecting column is arranged to pass through the first connecting hole, a first floating gap is provided between an inner wall of the first connecting hole and an outer wall of the first connecting column to enable the first connecting column to float radially within the first connecting hole, and the first connecting column is connected to the first connecting hole by a fastener.

11. The electronic device according to claim 10, wherein the fastener comprises a first screw and a first washer, an end face of the first connecting column is provided with a first threaded hole, the first screw is arranged to pass through the first washer and be threadedly connected to the first threaded hole, and the first washer abuts against an end face of the first connecting hole.

12. The electronic device according to claim 10, wherein one of the first connector and the connecting holder is provided with a second guiding column, the other of the first connector and the connecting holder is provided with a second guiding slot, and the second guiding column is inserted into the second guiding slot.

13. The electronic device according to claim 9, wherein the third connector comprises a stopper plate, an elastic member and a plug-in block, the floating plug is provided with a mounting hole, an inner wall of the mounting hole is provided with a loop-shaped stopper boss, the stopper plate is mounted to an end, far away from the second circuit board, of the mounting hole, and the plug-in block is provided with a stopper portion and a plug-in portion connected to each other, the stopper portion is located between the stopper plate and the loop-shaped stopper boss, an elastic member is provided between the stopper portion and the stopper plate, and the plug-in portion is arranged to pass through the loop-shaped stopper boss.

14. The electronic device according to claim 13, wherein the loop-shaped stopper boss is provided with a third guiding column on a side, close to the second circuit board, of the loop-shaped stopper boss, the second connector is provided with a third guiding slot, and the third guiding column is configured to be able to be inserted into the third guiding slot.

15. The electronic device according to claim 9, wherein the floating plug is located on a side of the first connector, one of the first circuit board and the floating plug is provided with a second connecting column, and the other of the first circuit board and the floating plug is provided with a second connecting hole, the second connecting column is arranged to pass through the second connecting hole, a second floating gap is provided between an inner wall of the second connecting hole and an outer wall of the second connecting column, to enable the second connecting column to float radially within the second connecting hole, and the second connecting column is connected to the second connecting hole by a fastener.

16. The electronic device of claim 9, wherein the flexible connecting member is a flexible circuit board or a flexible wire.

* * * * *